United States Patent [19]

Poeschel et al.

[11] 3,764,697

[45] Oct. 9, 1973

[54] METHOD OF USING DI-, TRI- AND TETRACHLOROBENZONITRILES FOR CONTROLLING HELMINTHS

[75] Inventors: Gordon Paul Poeschel, Pennington; John Anthony Pankavich, Hamilton Square, both of N.J.

[73] Assignee: American Cyanamid Company, Stamford, Conn.

[22] Filed: Apr. 19, 1972

[21] Appl. No.: 245,383

[52] U.S. Cl. ............................................... 424/304
[51] Int. Cl............................................. A61k 27/00
[58] Field of Search .................................... 424/304

[56] References Cited
OTHER PUBLICATIONS

Heinz et al.–Chem. Abst., Vol. 74, (1971), page 11780b

Primary Examiner—Sam Rosen
Attorney—Ernest Y. Miller

[57] ABSTRACT

A method of using di-, tri- and tetrachlorobenzonitriles is described. They are useful in controlling helminths in warm-blooded animals particularly trematodes of the family *Fasciolidae*.

9 Claims, No Drawings

METHOD OF USING DI-, TRI- AND TETRACHLOROBENZONITRILES FOR CONTROLLING HELMINTHS

SUMMARY OF THE INVENTION

This invention relates to a novel method for controlling helminths in warm-blooded animals comprising administering to said animals a composition containing an anthelmintically effective amount of a compound of the formula selected from the group consisting of:

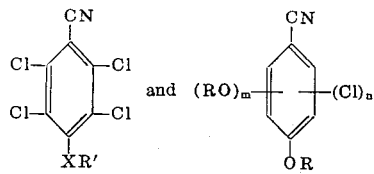

wherein R is alkyl ($C_1$-$C_4$) or alkenyl ($C_3$-$C_5$); R' is a member selected from the group consisting of hydrogen, alkyl ($C_1$-$C_4$), alkenyl ($C_3$-$C_5$), phenyl and loweralkylcarbonyl; X is a member selected from the group consisting of sulfur and oxygen; m is an integer selected from 1 and 2; n is an integer selected from 2 and 3; and providing that when X is sulfur, $R^1$ is hydrogen.

The term "loweralkyl" as used in this application and appended claims means alkyl having one to four carbon atoms.

In accordance with this invention, compounds having the above structure wherein —XR' is alkoxy ($C_1$-$C_4$) can be prepared by reacting pentachlorobenzonitrile with the appropriate alkali metal alkoxide. The reaction is generally carried out in an inert solvent such as pyridine, tetrahydrofuran or loweralkanol, at a temperature preferably between about 0° and 75°C.

Compounds having the structure shown above wherein —XR' is hydroxy or mercapto are known and it has been found that the hydroxy compound can be converted to the loweralkylcarbonyloxy derivative by reaction thereof with the appropriate anhydride. This reaction is preferably carried out in the presence of a solvent such as, for example, a loweralkylalcohol, tetrahydrofuran toluene or the like at a temperature between 5°C. and 75°C. Graphically this anhydride reaction may be shown as follows:

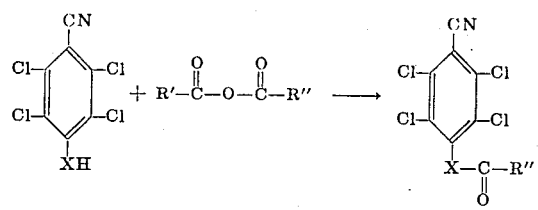

wherein R' is loweralkyl ($C_1$-$C_4$).

Conversion of pentachlorobenzonitrile to the desired hydroxylower alkyloxy (—XR') derivative can be achieved by treating the pentachlorobenzonitrile with the appropriate glycol in the presence of an alkali metal hydride, preferably sodium or potassium hydride.

Preparation of the alkenyloxy derivatives (—XR') can be achieved by reacting pentachlorobenzonitrile with an unsaturated alcohol ($C_3$-$C_5$) in the presence of strong base such as an alkali metal hydroxide and an inert solvent such as pyridine. The thus formed product can then be treated with halogen to yield the corresponding haloloweralkyl derivative.

Compounds having the formula:

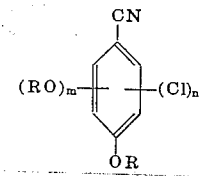

where R is alkyl ($C_1$-$C_4$) and m and n are as described above, can be prepared by reacting pentachlorobenzonitrile with a large excess of alkali metal alkoxide (i.e., 2 or 3 mole equivalents) in a loweralkylalcohol in the presence of a solvent such as pyridine. Similarly, compounds where R is alkylene ($C_3$-$C_5$) and m and n are as described above, can be prepared by treating pentachlorobenzonitrile with an alkali metal hydride and a large excess of the unsaturated alkylalcohol ($C_3$-$C_5$).

The compounds of this invention are highly effective anthelmintic agents useful for the control of a wide variety of nematodes, trematodes and cestodes in domestic, farm, fur-bearing, laboratory and zoo animals. They are particularly active against both mature and immature liverfluke of the family *Fasciolidae*, including *Fasciola gigantica, Fasciola californica, Fasciola hepatica, Fascioloides magna, Fasciolopsis buski, Fasciola indica* and *Fasciola halli*, which are commonly found in sheep, goats, swine, deer, horses and cattle. They are also very effective when used for the control of *Trichostrongylus colubriformis* and *Ostertagia circumcincta* in sheep, goats and cattle, and have been found active against *Nematospiroides dubius, Aspicularis tetraptera* and *Hymenolepis nana*. These latter parasites which are frequently found in rodents and other animals are phylogenetically related to economically important parasites found in many domestic animals.

It has been found that effective helminth control and liverfluke control in sheep, goats, cattle, etc., can be achieved when the active compound is administered in a single dose at dosage levels of from 20 to 200 mg./kg. of animal body weight and preferably 20 and 100 mg./kg. of animal body weight. This represents a dose of from about 0.05 g. to about 80 g. depending upon the animal.

Advantageously, the active compounds can also be administered on a continuing basis in the diet of the animals at drug levels between 0.025 and 0.5 percent by weight of the feed and preferably between 0.025 and 0.25 percent by weight of the feed. For use in the feed, the active compound is generally formulated as a premix or supplement containing from about 5 to 25 percent by weight of drug. The remainder of the premix or supplement is usually a mixture of animal nutrients including soybean meal, fermentation residues, ground grain, corn meal, vegetable oil and the like. The premix or supplement is added (usually at or near the site of use) to the finished animal feed in sufficient amount to provide the drug concentration required for controlling the helminth infection.

Boluses, tablets, pills, capsules and the like which are used for administration of the drug as a single dose are generally prepared by mixing the desired quantity of drug with a pharmaceutically acceptable carrier or diluent such as dicalcium phosphate, starch and lactose. Magnesium stearate may be added as a lubricant and a vegetable gum may be included as a binder. Materials such as bismuth subcarbonate or bismuth subnitrate may also be added to boluses, tablets and the like which are destined for use in ruminant animals. The latter materials incrase the density of the dosage units and help to maintain them in the rumen until they are dissolved.

When the drug is to be administered in the form of a drench, the anthelmintic agent is generally mixed with an inert diluent such as attapulgite or kaolin, a water soluble starch, a surfactant and a cellulose derivative. This formulation usually contains from about 25 to 75 percent by weight of the anthelmintic agent and is usually admixed with water or milk just prior to use.

SPECIFIC DESCRIPTION

The invention is further illustrated by the examples set forth hereinafter describing the preparation of the present compounds and testing against various helminths.

EXAMPLE 1

Preparation of 2,4,6-Trimethoxy-dichlorobenzonitrile

Into a 2 liter glass flask is placed 66.0 grams (0.024 mole) pentachlorobenzonitrile and 1.5 liters pyridine. After cooling this solution to 5°C., 218 gms. (0.99 mole) of a 25 percent sodium methoxide in methanol solution is added at a rate such that the temperature of the reactants do not exceed 25°C. Following completion of the addition, the temperature is increased to 50°C. and stirring continued for 30 minutes. When cool, the crude reaction mixture is treated with a large volume of cold water, then filtered. The almost white trimethoxy-dichlorobenzonitrile weighs 47.9 gms.; analysis of this material by gas liquid chromatography (GLC) indicates the purity to be 100 percent. Recrystallization from petroleum ether gives long white needles, melting point 132.5°–133.5°C.

EXAMPLE 2

Preparation of 4-Methoxy-tetrachlorobenzonitrile

To a cold (4°C.) solution of 66.0 gms. (0.24 mole) pentachlorobenzonitrile in 1,200 ml. pyridine is added dropwise with stirring 57.0 gms. (0.26 mole) of a 25 percent sodium methoxide-methanol solution. After addition of the sodium methoxide has been completed, the reaction temperature is increased to 35°C. and maintained at that temperature for 30 minutes. The cool reaction mixture is poured into a large excess of water, filtered, and the filtrate discarded. The solid is dissolved in chloroform, treated with magnesium sulfate, filtered, then placed under reduced pressure until free of solvent. The weight of the white, rather fluffy solid is 59.2 gms., which corresponds to a 92.1 percent yield of methoxy-tetrachlorobenzonitrile, melting point 136°–145°C.

EXAMPLE 3

Preparation of 4-Methoxy-tetrachlorobenzonitrile

A mixture of 11.0 gms. (0.04 mole) pentachlorobenzonitrile in 200 ml. dioxane is placed in a 500 ml. glass reaction vessel. A solution of 25 percent sodium methoxide in methanol (9.5 gms., 0.042 mole) is quickly added in one portion with vigorous stirring of the reaction mixture. After the orange colored mixture has been heated at 55°C. for 30 minutes, it is poured into water, then filtered. There is isolated 10.7 gms. (98.8 percent yield) of pale yellow methoxy-tetrachlorobenzonitrile.

EXAMPLE 4

Preparation of 3,4-Dimethoxy-trichlorobenzonitrile

A solution of 114.0 gms. (0.528 mole) of a 25 percent sodium methoxide-methanol in 100 ml. absolute methanol is added dropwise to a stirred solution of 66.0 gms. (0.25 mole) pentachlorobenzonitrile in 1,500 cc of pyridine. The rate of the sodium methoxide addition is adjusted so that the original temperature of the solution (20°C.) is maintained until the addition has been completed. Thereafter, the reaction mixture is stirred at 35°C. for 60 minutes. Using the same product recovery technique as described for the isolation of the monomethoxy derivative in Example 2, 55.8 gms. of a white crystalline solid is obtained; the yield of dimethoxytrichlorobenzonitrile is 94.5 percent. Crystallization from carbon tetrachloride gives fine needles, melting point 105.5°–107°C.

EXAMPLE 5

Preparation of 4-t-Butoxy-tetrachlorobenzonitrile

To a solution of 27.5 gms. (0.1 mole) pentachlorobenzonitrile in 200 ml. tetrahydrofuran is added 11.2 gms. (0.1 mole) potassium t-butoxide. After stirring the resulting mixture at 25°C. for 1 hour, it is allowed to stand overnight. Following the addition of ice cold water, the mixture is extracted two times with ether. The combined ether extracts are dried over magnesium sulfate, filtered, then evaporated under reduced pressure. Both the NMR and infrared spectrum of this material are consistent with the following formula:

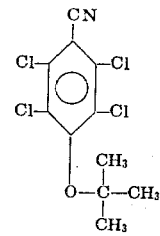

EXAMPLE 6

Preparation of 4-Ethoxy-tetrachlorobenzonitrile

A solution of sodium ethoxide in ethanol, prepared by adding 4.6 g. sodium to 150 ml. absolute ethanol, is quickly added to a mixture consisting of 55.0 g. pentachlorobenzonitrile and 260 ml. pyridine. To avoid reaction temperatures in excess of 75°C., ice water cooling is required.

Following the usual procedure described hereinbefore, there is isolated a colorless crystalline material (54.9 g.) which is 4-ethoxytetrachlorobenzonitrile.

EXAMPLE 7

Preparation of 4-Phenoxy-tetrachlorobenzonitrile

A mixture of 6.8 gms. potassium hydroxide, 9.8 gms. phenol, and 300 ml. toluene is heated until 150 ml. of toluene has distilled. To the resulting mixture is added 250 ml. pyridine followed by 27.0 gms. pentachlorobenzonitrile. After heating at 50°C. for 2 hours, the crude reaction produce is poured into water. Filtration of the resulting mixture provides 28.0 gms. of 4-phenoxy-tetrachlorobenzonitrile. Crystallization from heptane-toluene gives small colorless plates, melting point 196°–199°C.

EXAMPLE 8

Preparation of 3,4-Dichlorotriallyloxybenzonitrile

To a slurry of 3.3 gms. sodium hydride in 300 ml. of tetrahydrofuran (THF) is added dropwise 8.4 gms. allyl alcohol in 50 ml. of THF. Addition of 9.0 gms. pentachlorobenzonitrile causes a rapid increase in the temperature of the reaction mixture and cooling is necessary. After stirring for 30 minutes, the contents of the reaction flask are transferred to a large beaker, then treated with water. Filtration of the aqueous mixture gives a white crystalline solid, dichlorotriallyloxybenzonitrile which, when dry, weighs 10.0 gms. (90.2 percent yield). Crystallization from heptane-diethyl ether gives long colorless needles of 3,4-dichlorotriallyloxybenzonitrile, melting point 87°–89°C.

EXAMPLE 9

Preparation of 4-Allyloxytetrachlorobenzonitrile

A mixture of 400 ml. allyl alcohol and 20 gms. sodium hydroxide is heated over a period of 1 hour (55°C. maximum temperature) during which time approximately 50 ml. of liquid is removed under reduced pressure. When the resulting solution has been cooled to 20°C., 500 ml. pyridine and 137.6 gms. pentachlorobenzonitrile are added over a period of 5 minutes. After stirring for 1 hour at 30°C., the temperature is increased to 40°C. for 30 minutes then decreased to 30°C. for 2 hours. Addition of water followed by filtration gives 137 gms. of light tan solid which is shown to be 4-allyloxytetrachlorobenzonitrile (92 percent yield). Calculated for $C_{10}H_5Cl_4NO$, 297.0: 40.44% C, 1.70% H, 47.75% Cl, 4.72% N. Found: 40.94% C, 1.73% H, 47.0% Cl, 4.01% N.

EXAMPLE 10

Preparation of 3,4-Diallyloxytrichlorobenzonitrile and 3,5-dichlorotriallyloxybenzonitrile Allyl alcohol (750 ml.) and sodium hydroxide (120 gms.) are heated at 60°C. for 2 hours. After adding 1 liter of pyridine the resulting mixture is warmed at 55°C. until 70 ml. of liquid is collected. Pentachlorobenzonitrile (275.3 gms.) is then introduced into the reaction vessel at atmospheric pressure at a rate such that the maximum temperature does not exceed 40°C. After completing the addition, the crude reaction mixture is poured into water. Isolation of the product, which is a mixture of 3,4-diallyloxytrichlorobenzonitrile and 3,5-dichlorotriallyl-oxybenzonitrile, is achieved by filtration. When dry, the light tan solid weighs 245 gms.

EXAMPLE 11

Mouse Evaluation (Efficacy)

The primary target parasite in this test is *Nematospiroides dubius* (Family *Heligosomidoes*) which is phylogenetically related to certain economically important parasites of domestic animals.

Mice are orally inoculated with 20–30 infective larvae of *N. dubius*. Mixed infections are obtained by subsequent inoculation with *Aspicularis tetraptera* and *Hymenolepis nana*. Eighteen days after inoculation the mice are divided into groups of four. Each group receives one compound at a specified dose rate, either single gavage dose or fed continually in the feed. Four groups are held as infected untreated controls. For those mice receiving continual treatment, the compounds are mixed in the diet (0.005–~0.1 percent drug diet) and fed for 7 days (initiated 18 days after inoculations. Those mice receiving single gavage doses are treated 22 days after inoculation (200–500 mg./kg. B.W.). Eight days after start of treatment (drug diet) and 4 days post treatment (SOD) the mice are necropsied, the worms recovered and counted. Percent efficacy for *Nematospiroides* is calculated with the formula:

$$\frac{\text{Avg. No. of worms in control} - \text{Avg. No. of worms in treated}}{\text{Avg. No. of worms in control}} \times 100 = \text{Percent efficacy}$$

Tapeworm and pinworm efficacy is determined by the presence or absence of worms in each treated mouse (5 percent confidence limits in Mainland tables).

The diet used in both test procedures is a standard commercial mouse chow containing meat and bone meal, dried skimmed milk, wheat germ meal, fish meal, animal liver meal, dried beet pulp, ground extruded corn, oat middlings, soybean meal, dehydrated alfalfa meal, cane molasses, animal fat preserved with BHA, vitamin $B_{12}$ supplement, calcium pantothenate, choline chloride, folic acid, riboflavin supplement, brewers' dried yeast, thiamine, niacin, vitamin A supplement, D activated plant sterol, vitamin E supplement, dicalcium phosphate, iodized salt, ferric ammonium citrate, iron oxide, manganous oxide, cobalt carbonate, copper oxide and zinc oxide; and the desired level of test compound.

When the drug is administered as a single oral dose, the drug is weighed and suspended in a 0.2 percent agar thoroughly mixed and orally introduced at the required volume.

Data obtained are reported in Table I below.

TABLE I

Anthelmintic activity of tetrachlorobenzonitriles in mice

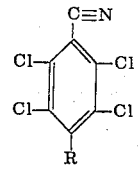

| R | Drug diet + | | | | Single oral dose + | | | |
|---|---|---|---|---|---|---|---|---|
| | Dose*, percent | N.d. | A.t. | H.n. | Dose ** | N.d. | A.t. | H.n. |
| R=—OH | 0.1 | 91 + | | | 250 | 100 | NT | NT |
| | 0.05 | 82 + | | | 200 | 78 | + | + |
| | 0.025 | 53 + | + | | 100 | — | + | + |
| R=—OCH₃ | 0.05 | 100 + | + | | 500 | 51 | + | + |
| | | | | | 250 | 55 | + | + |
| R=—OC₂H₅ | 0.1 | 96 + | + | | NT | | | |
| | 0.05 | 46 + | — | | NT | | | |
| R=—O—CH₂—CH=CH₂ | 0.1 | 68 + | | | 500 | — | — | — |
| | 0.05 | 55 — | — | | | | | |
| R=O—CO—CH₃ | 0.1 | 100 + | + | | NT | | | |
| | 0.05 | 53 + | + | | NT | | | |
| R=O—C(CH₃)₃ | 0.5 | 0 + | + | | NT | | | |

*Percentage of compound in diet fed for 7 days.
**Expressed as mg./kg. body weight given by single gavage dose.
N.d.=*Nematospiroides dubius*; A.t.=*Aspicularis tetraptera*; H.n.=*Hymenolepis nana*.
+ N.d.=percent activity, +=active, —=inactive, NT=not tested.

EXAMPLE 13

To determine the acute oral toxicity of the test compounds in mice and rats, the animals are randomly divided into groups of five. The desired level of compound to be administered is suspended in a 0.2 percent agar or corn oil and administered by gavage to the test animals. The treated animals are then placed in cages and held for 10 days. During the holding period, drinking water and an untreated commercial mouse or rat chow, such as described in Example 12, is provided ad libitum. After 10 days the animals are examined and mortality counts made.

Data obtained are provided in Table II below.

TABLE II

Acute oral toxicity in mice and rats

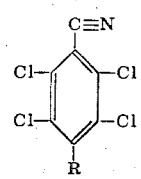

| Compound R | Test animal | Number dead/total number tested |||||||||
|---|---|---|---|---|---|---|---|---|---|---|
| | | 31.3 | 50 | 62.5 | 80 | 100 | 125 | 250 | 500+ | |
| R = —OH | Mouse | | | 0/5 | | | 0/5 | 5/5 | 5/5 | |
| | Rat | 0/5 | | 3/5 | | | 4/5 | 5/5 | | |
| R = —OCH₃ | Mouse | | | 0/5 | | | 0/5 | 1/5 | 5/5 | |
| | Rat | | | | | | | 1/5 | 0/5 | 1/5 |

+ Expressed as mg./kg. given single gavage dose.

EXAMPLE 14

Sheep Evaluation (Efficacy)

Lambs of mixed breeding are experimentally inoculated with *Ostertagia circumcincta*. At patency of the parasites the lambs are divided into groups of two animals each. One group served as infected untreated controls. Lambs are treated (single oral dose) with 50 mg./kg. of the p-hydroxytetrachlorobenzonitrile test compound in a 0.2 percent agar. Percent efficacy is calculated as above for *N. dubius* and 60 percent control of *O. circumcincta* is obtained.

Antifluke activity is determined on a controlled basis for a variety of test compounds. Lambs are naturally infected with *Fasciola hepatica*. Initial tests are conducted using groups of three lambs. One group served as infected untreated controls. Lambs are treated at dose rates of 20, 35, or 50 mg./kg. B.W. (SOD). After titration of the two most active mouse helminth leads, subsequent compounds are evaluated in one lamb at 20 mg./kg. Percent efficacy is calculated as above. Data obtained are reported in Table III below.

TABLE III

The effect of benzonitrile compounds against *fasciola hepatica* in sheep

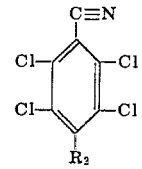

| R₂ | Oral dosage, mg./kg. | Number of animals | Percent egg reduction | Average number flukes recorded | Estimated percent control |
|---|---|---|---|---|---|
| —OCH₃ | 50 | 2 | 100 | 0 | 100 |
| | 35 | 3 | 100 | 0 | 100 |
| | 20 | 3 | 99 | ᵃ 4 | >90 |
| —OH | 50 | 2 | 100 | 0 | 100 |
| | 35 | 3 | 100 | 0 | 100 |
| | 20 | 3 | 99 | ᵃ 7 | >90 |
| —SH | 20 | 1 | 100 | 0 | 100 |
| —O—CH₂—CH=CH₂ | 20 | 1 | 99 | 11 | 90 |
| —OC₂H₅ | 20 | 1 | 55 | 6 | ±50 |
| —O—CO—CH₃ | 20 | 1 | 70 | 54 | |
| Controls | 0 | 5 | | 34(3-74) | |

ᵃ Majority less than 2.8 cm.

We claim:

1. A method for the control of helminths in a warm-blooded animal comprising orally administering to said animal an anthelmintically effective amount of a compound of the formula selected from the group consisting of:

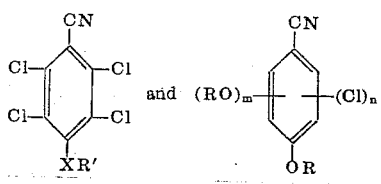

wherein R is a member selected from the group consisting of alkyl (C₁–C₄) and alkenyl (C₃–C₅); R' is a member selected from the group consisting of hydrogen, alkyl (C₁–C₄), alkenyl (C₃–C₅), phenyl and loweralkylcarbonyl; X is a member selected from the group consisting of sulfur and oxygen; m is an integer selected from 1 and 2; n is an integer selected from 2 and 3; with the proviso that when X is sulfur R' is hydrogen.

2. A method according to claim 1, wherein said compound is administered to said animal in feed containing from 0.025 to 0.5 percent by weight of said compound in said feed.

3. A method according to claim 1, wherein said compound is orally administered to said animal as a single oral dose at a dosage level of from 20 mg./kg. of animal body weight to 200 mg./kg. of animal body weight.

4. A method according to claim 1, wherein the helminths are liver flukes.

5. A method for controlling liver fluke in a ruminant animal comprising orally administering to said animal a flukicidal amount of a compound of the formula selected from the group consisting of:

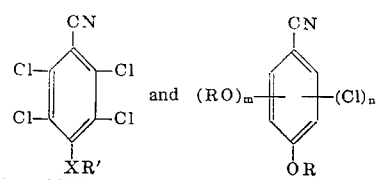

wherein R is a member selected from the group consisting of alkyl ($C_1$–$C_4$) and alkenyl ($C_3$–$C_5$); R' is a member selected from the group consisting of hydrogen, alkyl ($C_1$–$C_4$), alkenyl ($C_3$–$C_5$), phenyl and loweralkylcarbonyl; X is a member selected from the group consisting of sulfur and oxygen; $m$ is an integer selected from 1 and 2; $n$ is an integer selected from 2 and 3; with the proviso that when X is sulfur R' is hydrogen.

6. A method according to claim 5, wherein said compound is administered to said animal in feed containing from 0.025 to 0.5 percent by weight of said compound in said feed.

7. A method according to claim 5, wherein said compound is orally administered to said animal as a single oral dose at a dosage level of from 20 mg./kg. of animal body weight to 200 mg./kg. of animal body weight.

8. A method according to claim 5, wherein the compound has the formula:

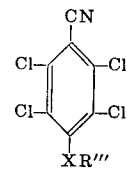

wherein X is sulfur and R' is hydrogen.

9. A method according to claim 5, wherein the compound has the formula:

wherein X is oxygen and R''' is a member selected from the group consisting of hydrogen, alkyl ($C_1$–$C_4$), alkenyl ($C_3$–$C_5$), hydroxyalkyl ($C_1$–$C_4$), haloalkyl ($C_1$–$C_4$), phenyl and loweralkylcarbonyl.

* * * * *